DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 6

T951,002

AUXILIARY CLIMATE CONTROL SYSTEM FOR A MULTI-PASSENGER VEHICLE

David P. Bosworth, Plymouth, and Donald A. Caley, Dearborn Heights, Mich., assignors to Ford Motor Company, Dearborn, Mich.

Continuation of abandoned application Ser. No. 461,198, Apr. 15, 1974. This application July 18, 1975, Ser. No. 597,265

Int. Cl.[2] B60H 9/00; F23F 27/02

U.S. Cl. 165—43

2 Sheets Drawing. 12 Pages Specification

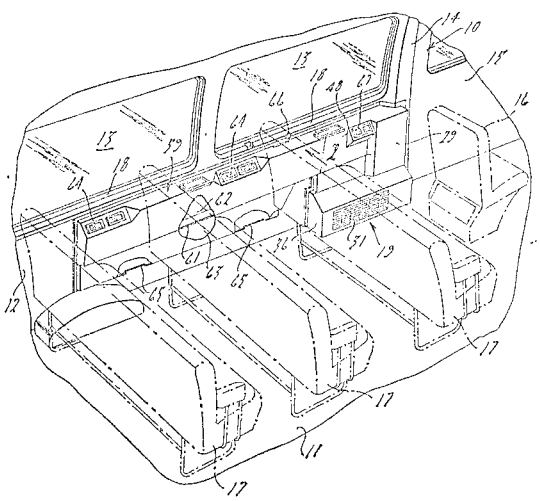

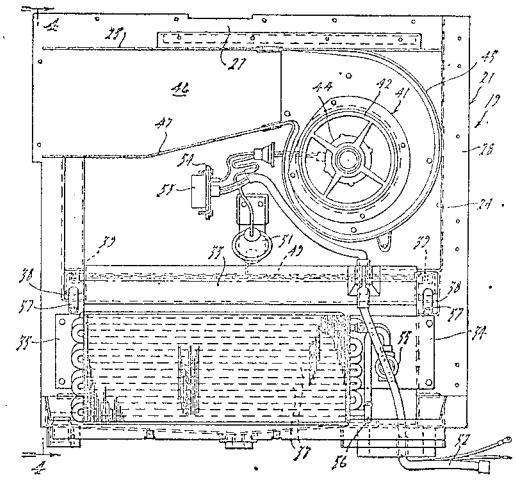

Figure 1:
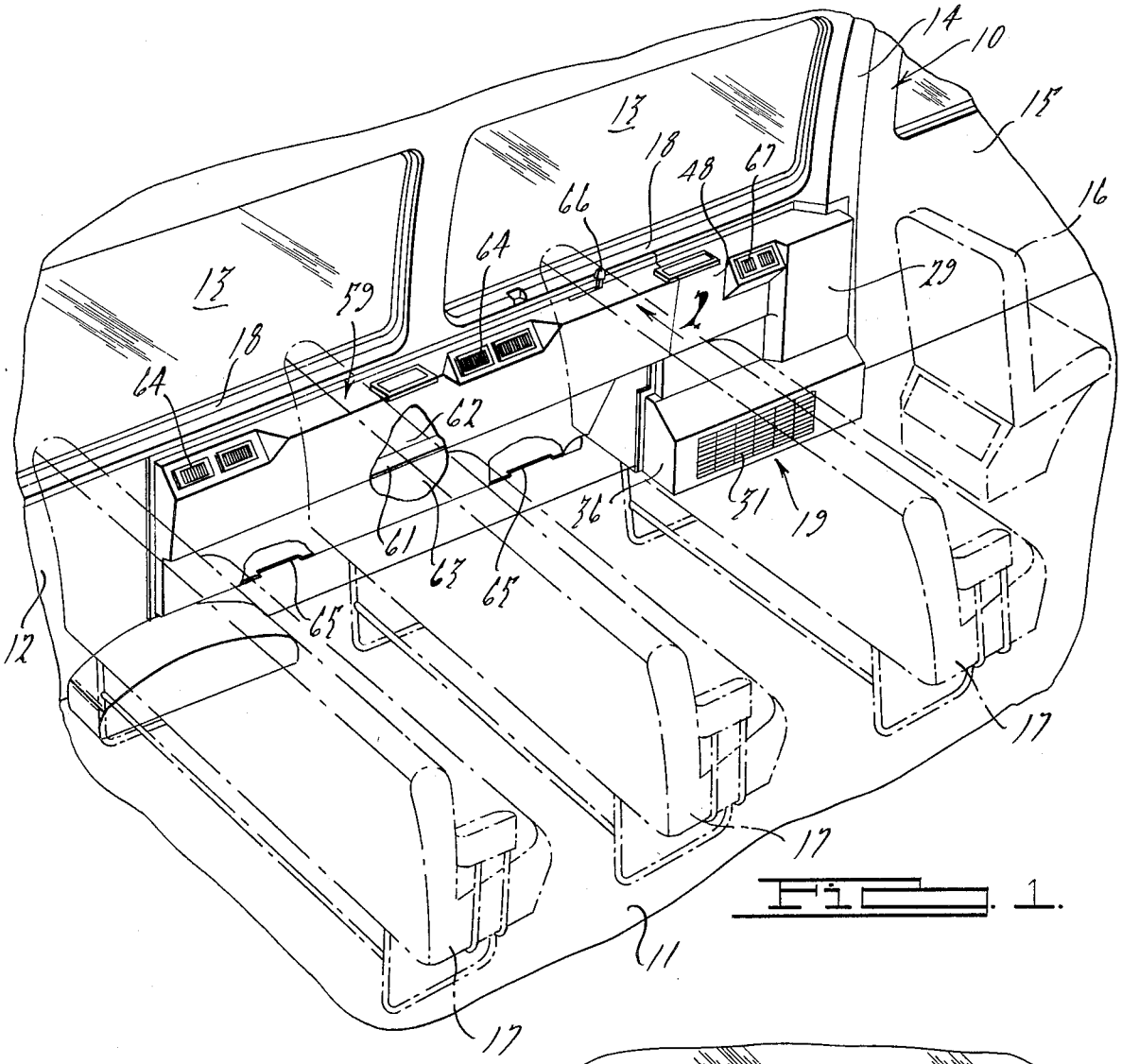
Figure 2:
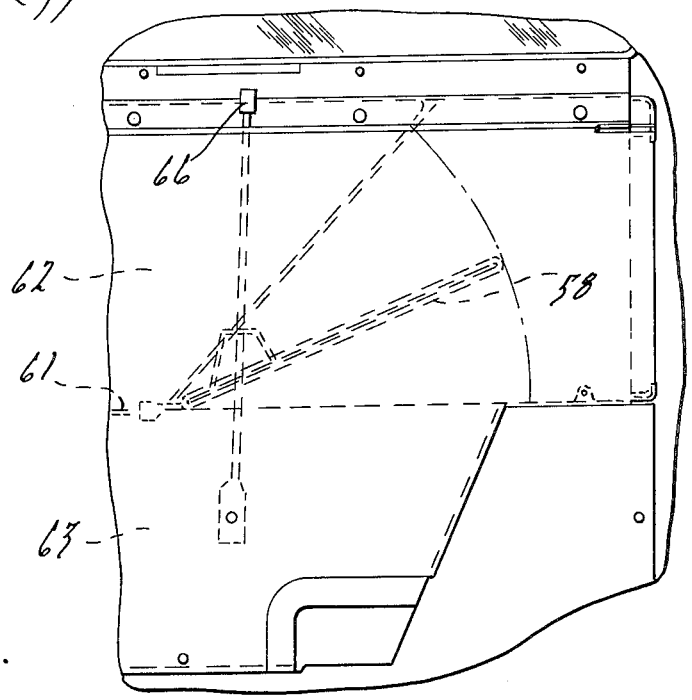
Figure 4:
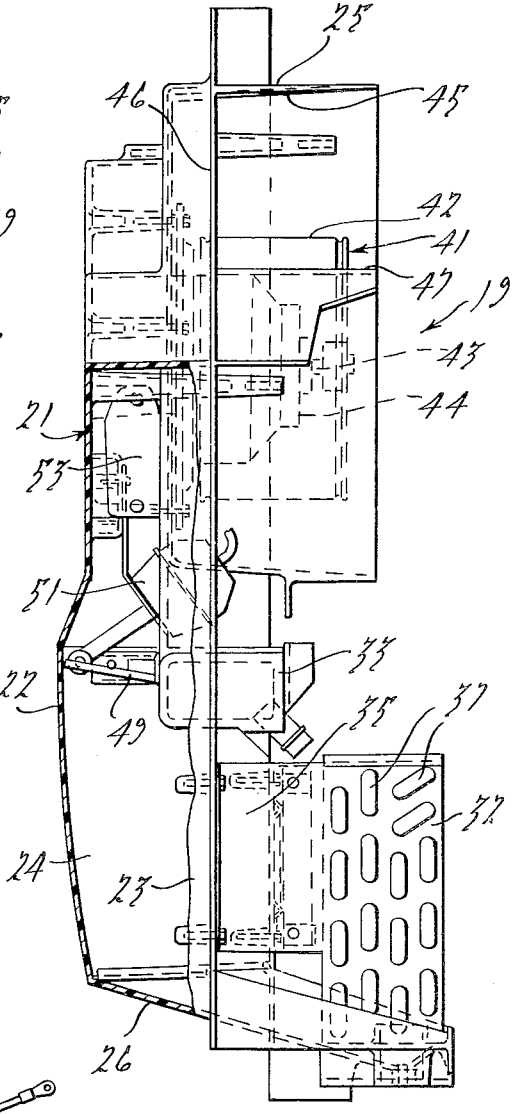
Figure 3:
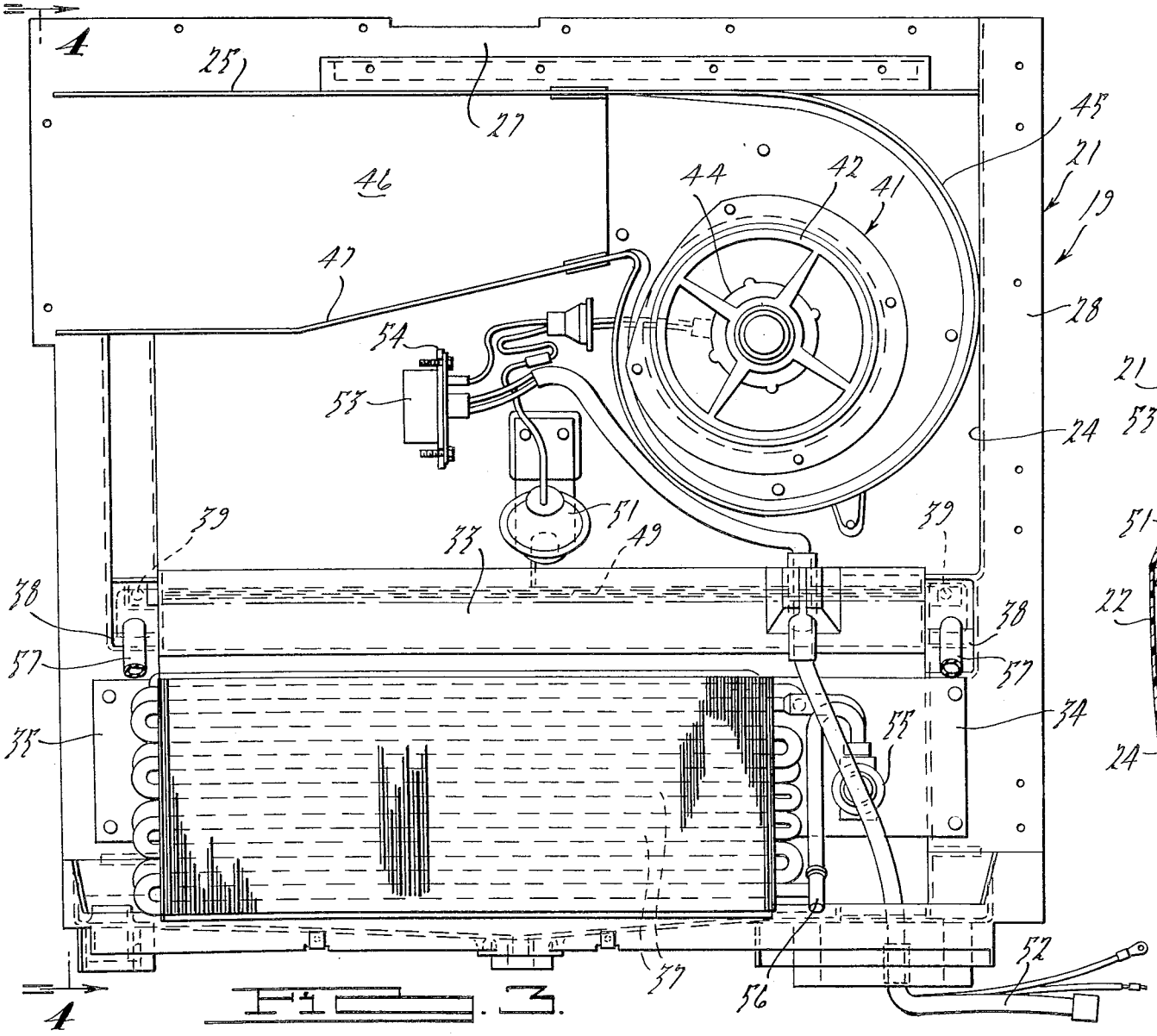

An auxiliary climate control system for a multipassenger vehicle comprising a casing fitted into a sidewall of the vehicle beneath a forward window, the casing extending from the vehicle floor to the base of the window, as shown in FIG. 1 and having its vertical front face open to the interior of the vehicle. The casing, as shown in FIGS. 3 and 4, is compartmented to receive in substantially vertical relationship a blower unit superimposed over a heat transfer means which may consist of a refrigerant evaporator, a heater core or both. A closure panel having an air intake grill at its base covers the open face of the casing to enclose the casing contents. A duct means is located below the windows and extends lengthwise along the sidewall toward the rear of the vehicle, the duct means being connected to exhaust openings in an end sidewall of the covered casing. The duct means is partitioned into upper and lower parallel chambers each having a plurality of outlets extending the length thereof. A valve means in the duct means, as shown in FIG. 2, adjacent the connection to the covered casing may be operated to proportion the flow of air from the blower unit into the upper and the lower chambers of the duct for discharge through the respective outlet openings.

AUXILIARY CLIMATE CONTROL SYSTEM
FOR A MULTI-PASSENGER VEHICLE

Original Filed July 18, 1975

AUXILIARY CLIMATE CONTROL SYSTEM
FOR A MULTI-PASSENGER VEHICLE

Original Filed July 18, 1975